Patented June 30, 1942

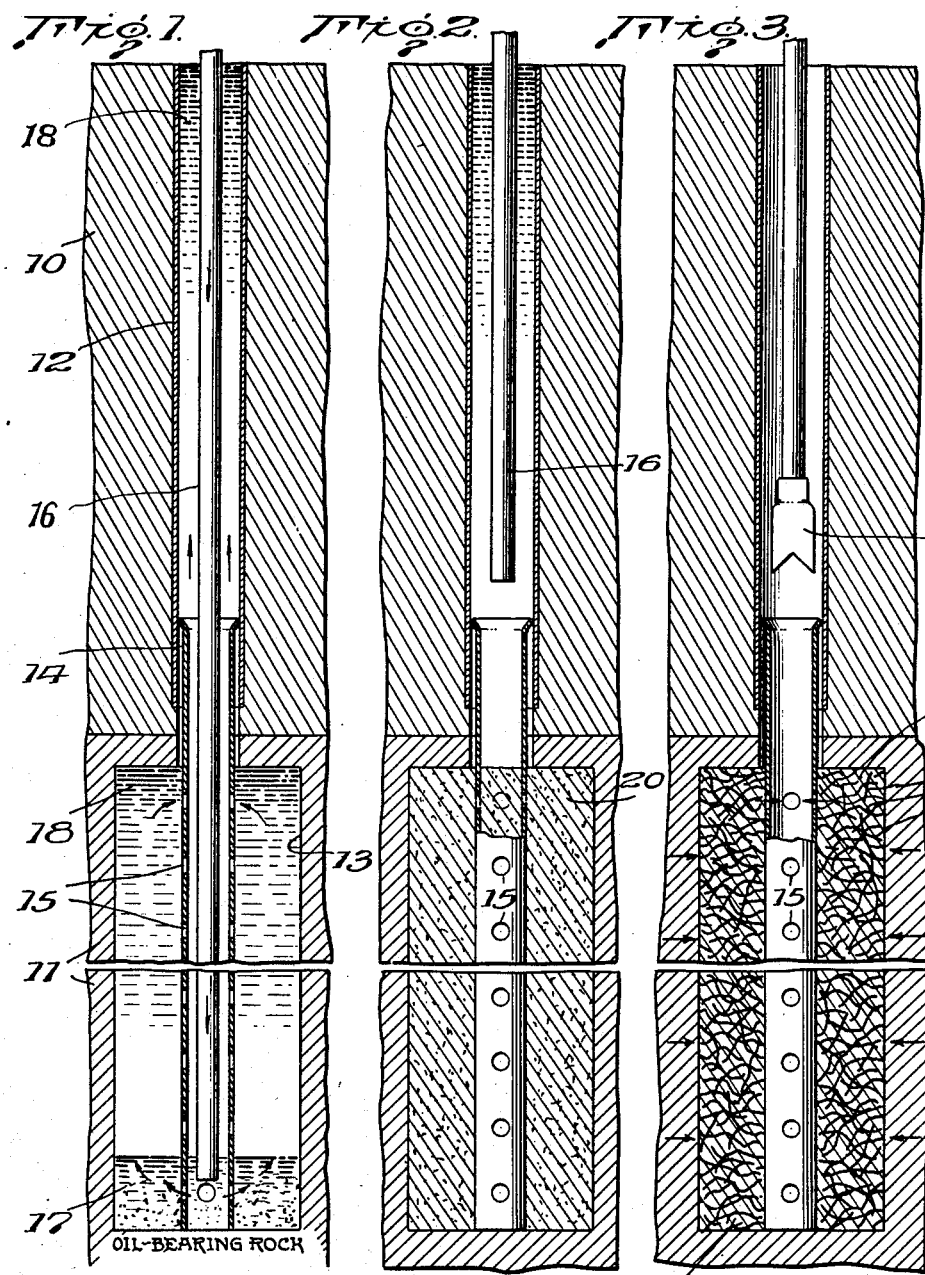

2,288,557

UNITED STATES PATENT OFFICE 2,288,557

METHOD OF AND COMPOSITION FOR PROVIDING PERMEABLE CEMENT PACKS IN WELLS

Leslie W. Vollmer, Pittsburgh, Pa., assignor to Gulf Research & Development Company, Pittsburgh, Pa., a corporation of Delaware Application June 20, 1940, Serial No. 341,543

18 Claims. (Cl. 166—26)

This invention or discovery relates to methods of and compositions for providing permeable cement packs in wells; and it comprises a method of providing permeable cement packs in oil or gas wells which comprises introducing into the producing region of such a well a slurry of cement containing granules of a porous material of high permeability, the pores of which are temporarily stopped with a substance removable by oil or other flushing medium, and also containing a gas generating agent, causing the slurry to set adjacent the producing region with development of initial permeability by gas expansion, and flushing out the pore-stopping material; and it further includes a composition useful for such purposes comprising cement, granules of a fine-pored, permeable material carrying a removable substance temporarily closing the pores, and gas generating material in amount sufficient to generate enough gas, when the composition gaged with water is caused to set under superatmospheric pressure, to establish an initial permeability through the set mass; all as more fully hereinafter set forth and as claimed.

Among the objects of the present invention are the provision of a cement pack or strainer-like body in oil and gas wells, which has a high permeability even when installed under unfavorable pressure and temperature conditions; and the provision of such a pack in which a permeable aggregate is utilized for establishing most of the permeability of the completed pack, and the permeability of the aggregate is preserved from deterioration during the preparation and installation of the pack.

In preparing oil wells for production it is desirable to establish a permeable body between the producing rock formation and the well proper or the tubing. Gravel bodies or packs have been employed to some extent, but they are not always satisfactory. The channels between the pieces of gravel are large enough to let pass a good deal of sand, which to some extent nullifies the purpose of the pack and which sometimes results in sanding up and stoppage of the pack itself. Passage of even a small amount of sand may result in damage to the pump. Also gravel is unstable and tends to shift.

It has also been proposed to provide bodies or packs of permeable cement, containing a porous aggregate such as coke. However, most such proposals have disregarded certain essential requirements. It is simple to prepare a porous gas-expanded cement under ordinary (atmospheric pressure) conditions, but to achieve this under bottom-hole pressures of several thousand pounds per square inch is another matter. For example, at 3000 pounds pressure the void volume due to generated gas is only about 0.005 that developed under atmospheric pressure, for gases closely obeying Boyle's law. Furthermore, most prior proposals have ignored the fact that porosity is by no means necessarily associated with permeability. A cement can be full of holes (gas bubbles) but have a permeability practically zero if the voids are not interconnected to any great extent as is usually the case. Mere incorporation of coke, slag, etc. helps little, because such materials, while very porous, exhibit a quite variable but never large permeability (of the order of 0–30 millidarcies). The voids are not interconnected to any great extent. Furthermore, the voids in coke, slag and like vesicular materials are often very large and when the porous material is crushed to a granule size permitting pumping of the slurry (say $\frac{1}{16}$ inch) there may be left no residual porosity, let alone permeability. And what permeability such substances have is apt to be destroyed by cement plugging the pores.

It has also been proposed to incorporate asphalt in ordinary oil-well cements, with the thought that the asphalt would be dissolved out by the oil to leave fluid passages, but as a matter of fact such cements remain impermeable indefinitely in contact with oil, because the oil cannot get to the asphalt within the cement to dissolve it out.

According to the present invention there is provided a cement pack for wells which exhibits a very high and uniform permeability even when formed under severe conditions of back pressure. To provide a permeable mass the invention makes use of a grog or aggregate composed of particles which have, individually, a very high permeability. The particles have myriad microscopic pores, and the pores are largely interconnected. To afford the requisite strength, the requirements for which are rather high, Portland cement is employed as a matrix for the grog. In order to prevent sealing up of the pores of the grog particles, the particles are preliminarily stopped up with some substance such as a viscous oil or tar which is not removable by water but which is removable by oil or other solvent. Finally, in order to insure an initial permeability sufficient to let the oil being produced percolate through the set cement and flush out the pore-stopping substance, I incorporate in the cement composition a suitable quantity of gas generating reagents, of a type adapted to generate a gas which is relatively insoluble in water, whereby a sufficient initial permeability can be established in the cement even under very heavy pressures maintained during the setting. The best gas for my purpose is hydrogen, which is relatively insoluble in water and which suffers a relatively low decrease in volume under increase in pressure as compared with other gases. Substances adapted to generate oxygen and nitrogen are also useful.

In carrying out the invention, an aqueous slurry of Portland cement is made up containing a permeable aggregate prepared as described and a gas generating substance, and the slurry is introduced into the lower part of the well next the producing formation. After the cement sets, pressure is relieved and the well caused to produce. Oil under formation pressure makes its way through the gas pores and soon flushes out the pores of the permeable aggregate, whereby the cement mass is left in a highly permeable condition, while preserving adequate strength. The pack possesses both the permeability due to the nature of the aggregate and that due to the gas pores. It can readily be made to have a permeability equal to that of the formation itself.

The best material for the aggregate in my cement pack compositions at present known to me is a permeable refractory, crushed and screened to a predetermined granule size. Permeable refractory articles are generally made by firing a molded fire-clay brick or slab containing a high proportion of a fibrous or granular combustible organic material such as sawdust, cork flour, coconut fiber, etc. This material burns out in the firing, leaving minute interconnecting voids throughout the fired article. The permeability is determined by the proportions of the organic material and its state of subdivision. For my purposes, a refractory material of this character of relatively fine pore size and having a permeability of 60,000 to 80,000 millidarcies (60 to 80 darcies) is best.

The pores in the granules are much smaller than the granule size range employed in preparing the slurry. Sand is effectively restrained; even very fine sand, while sanding up of the pack itself is obviated because the sand cannot get into the pores.

To prevent clogging of the grog with cement during mixing, the grog is filled previously with a substance that subsequently can be removed from the pack by a suitable solvent such as high melting point waxes, resins, tars, and viscous oils which are soluble in crude oil or other organic solvents such as naphtha, benzol, carbon tetrachloride, etc. Excellent results have been obtained with a still residue oil which has a viscosity of 2900 S. U. V. at 210° F. High viscosity at elevated temperatures is desirable to prevent displacement of the grog pore filler by water and cement before the pack has attained an initial set, even under high bottom hole temperatures. It is also desirable to provide that all the air in the grog be displaced by the pore filler substance so that cement will not be forced into the pores as the result of compression of trapped air.

The mesh size of the grog is controlled so that maximum packing of the particles obtains, and the maximum particle size is selected such that the fluidity and pumpability of the slurry is not impaired. Grog that passes an 8-mesh screen and is retained on a 20-mesh screen gives eminently satisfactory results. Because the grog tends to impart harshness to the slurry the addition of a plasticizer such as diatomaceous earth (celite) or bentonite is advantageous in improving the workability or pumpability of the slurry.

A pack-forming mixture having the following composition sets under a pressure of 1000 to 1500 pounds per square inch to form a pack having the remarkable permeability of 4500 millidarcies (4.5 darcies) after the oil in the grog has been flushed out.

|  | Pounds |
|---|---|
| Portland cement, high temperature grade | 100 |
| Aluminum powder, flitter grade | 8.0 |
| Slaked lime, Ca(OH)$_2$ | 10.9 |
| Diatomaceous earth (plasticizer) | 5.0 |
| Water | 90 |
| Sodium chromate (inhibitor) | 0.8 |
| Oil filled grog (8-20-mesh) | 105 |

The weight ratio of grog to oil is approximately 2:1. Flitter grade aluminum powder as specified has advantages over aluminum wool or ordinary 100-mesh powder because the particles are coarse, thin flakes which produce elongated gas bubbles such as are obtained with aluminum wool and at the same time react with the completeness of 100-mesh powder.

In preparing the slurry for a pack, the cement, lime, aluminum powder, the diatomaceous earth (plasticizer) are best mixed dry. Water containing the inhibitor is then added and mixed until the slurry is smooth, after which the oil filled grog is added. Mixing is continued just long enough to produce uniformity. The grog is previously filled with viscous oil by heating the required amount of oil to approximately 350° F. for thinning and pouring on the grog while stirring; the mixture is stirred until cool to prevent balling or lumping.

The following table shows an advantageous range of proportions of the ingredients comprising the pack exemplified above. All parts are by weight.

| | |
|---|---|
| Portland cement | 100 |
| Aluminum powder (flitter grade passing 8-mesh) | 3-20 |
| Slaked lime, Ca(OH)$_2$ | 0-28 |
| Plasticizer | 0-5 |
| Water | 50-100 |
| Inhibitor (sodium chromate) | 0-4 |
| Permeable grog (8-20-mesh) | 50-100 |
| Grog filler (viscous oil, etc.) | 25-50 |

The proportion of gas generating agent employed is relatively high, to ensure development of adequate initial permeability even when gas generation takes place against a back pressure of several thousand pounds per square inch. Thus when aluminum is employed I ordinarily employ 3 to 20 per cent aluminum, based on the dry weight of the cement, and a corresponding amount of alkali.

As stated, the special permeable refractory material described is excellent for my purposes. Not only is the permeability high but also the pores are so small as to keep back even the finest sand and silt. However, other materials having a true permeability rather than more porosity can be employed, such as small glass beads and tubes, and certain coarse sandstones. Some of the advantages of the invention are realized even when substances like coke, slag, pumice, diatomaceous earth and set expanded cement, of suitable granule size, are employed; such permeability as these substances have is preserved by provision of the pore stopping material as described. Furthermore, merely soaking the permeable aggregate in water is sufficient to preserve some of the permeability of the grog. In some cases it is feasible to dispense with the pore plugging material, especially when a grog is selected of such small pore size that cement particles are prevented from entering the pores. The refractory grog described can readily be prepared having such small pore size. Use of gas generating material is important in such a modification, in exposing the pores of the granules and in insuring communication between granules.

For the gas generating substances, aluminum and an alkali are especially efficient and convenient. The alkali can be added or can be that already associated with Portland cement. Certain other finely divided metals may be employed in a way analogous to aluminum, for example metallic calcium. There is no need to add lime to the cement when calcium is employed. A sodium amalgam, Na—Mg—Hg gives good results. These materials decompose water directly with production of hydrogen gas. Aluminum, however, is ordinarily the cheapest and most convenient metal to use. Substances adapted to generate other gases than hydrogen can be employed, such as calcium carbide or barium carbide which react with water to yield acetylene. In employing these carbides it is best to use powdered material the grains of which are coated with wax, stearic acid or other coating adapted to slow down the reaction with water. Ammonium nitrite can likewise be employed in the cement as a gas generating agent. Ammonium nitrite in aqueous solution undergoes autodecomposition at moderate temperatures, into water and free nitrogen. The rate of decomposition can be retarded by incorporation into the mix of ammonia or certain organic amines.

While Portland cement is especially advantageous for my purposes, other cements or cementitious binders can be used, including slag cement, plaster of Paris, anhydrite cements, etc. especially where the requirements of strength and resistance to pressure are not severe.

Ordinarily the proportion of grog to cement is about 1 to 1 or somewhat less. These proportions provide a set cement of excellent strength and resistance to crumbling. In case high structural strength is not necessary, the proportion of grog can be increased with enhancement of permeability. It is usually best to employ cement in proportion sufficient to fill the voids between the grog granules, and rely on the inherent permeability of the granules for the permeability of the pack, as such voids if left open are coarse enough to let fine sand through. A significant advantage of my pack is that the channels are everywhere so small as to keep back even fine sand.

The burnt refractory grog described is useful in other procedures for forming filter bodies in wells, by virtue of the high permeability of the individual particles.

In the accompanying drawing there is illustrated in a diagrammatic or schematic manner a typical mode of carrying out the invention. In the drawing, Fig. 1 is a diagrammatic view of an oil well in central vertical section, showing the beginning of the permeable-cement-pack placing operation.

Fig. 2 is a similar view with the cement pack in position, and

Fig. 3 is a similar view, after setting of the cement as a pack and after drilling out the pack.

Referring to the drawing, there is shown by way of example a well extending from overlying consolidated formations 10 into an unconsolidated oil sand 11. The upper part of the well is cased as shown at 12. The producing region is advantageously reamed out as shown at 13. A liner 14, perforated at 15, is installed. A drill pipe or tubing 16 is lowered to near the bottom of the well, as shown, and a charge of a fluent slurry prepared as described, indicated at 17, is introduced under a load of water or oil in the tubing (not shown). The annular space between the tubing and the bore wall is initially filled with oil or water 18, which is displaced upwardly by the cement slurry. The cement flows into the well bottom as shown.

The cement slurry is forced down until the level thereof outside the tubing coincides with the level inside the tubing. This is accomplished in a known way, by measuring the quantity of oil or water displaced from the top of the casing. At the stage of operations indicated in Fig. 2, the tubing is raised above the cement charge, leaving the well bottom and liner filled therewith. Excess cement slurry can then be flushed out if desired by a circulation of oil or water between the tubing and the well. The cement is now given time to set, with development of some initial permeability by gas expansion, forming a pack 20.

When the cement is set the part within the liner is drilled out by a drill 22 (Fig. 3) to leave a chamber in the pack 20 having an extensive exposed face for influx of oil, as shown. The liner serves as a guide for the drill and keeps it from wandering. The well is allowed to produce. Oil percolates through the mass and soon flushes out the pore-stopping substance, greatly increasing the permeability of the pack. Interconnecting pores or channels are left throughout the pack as indicated in a strictly diagrammatic manner at 21. If desired, a drillable (soft metal) liner can be employed, this being drilled out to put the well in condition for production.

The principle of the invention is apparent from the above description. A relatively low initial permeability is produced in the pack by the generated gas, which permits the passage of a solvent (crude oil, etc.) which extracts the temporary filler from the permeable grog. Without some appreciable initial permeability it would be difficult to force a solvent through a sensible thickness of the pack and the desired high final impermeability would be out of the question.

Employment of an inhibitor for the gas generating reaction as described is advantageous in all embodiments, to delay the generation of gas so that no substantial proportion thereof is lost prior to placement of the cement slurry at the bottom of the well. An inhibitor is especially desirable when aluminum and alkali are employed as the gas generating agent. With the large quantities of these reagents utilized in the present method, the uninhibited reaction may take place in some cases unduly quickly. The sodium chromate inhibitor delays the reaction amply for all practical purposes, even when one or two hours are required to bring the cement slurry into the desired position in the well. The wax, etc., coating on carbides as described serves a similar purpose.

What I claim is:

1. A method of providing permeable cement packs in wells which comprises introducing into the well a charge of a cement slurry containing individually-highly-permeable granules, which are small enough to permit introduction of the slurry into place in a well by usual well-cementing methods, which have a permeability of the order of at least 60 darcies and which have the characteristics, as regards permeability and fluid channel shape and size, of granules made by burning clay containing finely-divided combustible material of elongated shape whereby to leave fine interconnected voids and channels in the clay on burning out the substance; said slurry also containing a gas generating agent of a length materially greater than the size of cement particles and in amount sufficient to develop permeability in the cement when caused to set under substantial super-atmospheric pressure such as obtains at the level of the producing regions of oil wells, whereby to establish communication, through the cement, between said highly permeable granules; and causing the slurry to set under super-atmospheric pressure and harden in the well.

2. A method of providing permeable cement packs in oil and gas wells which comprises introducing into the producing region of a well a slurry of cement containing granules of a material having small interconnecting voids and highly permeable to fluids, the voids thereof being temporarily plugged with a removable substance adapted to keep cement out of the pores, said slurry also containing a gas generating agent; causing the slurry to set adjacent the producing region of the well with development of initial permeability by gas generation, and causing a fluid capable of removing said substance to flow through the set cement pack.

3. A composition for providing permeable packs in wells, and adapted upon being gaged with water to form a slurry fluent enough to be installed in wells by usual well-cementing methods, comprising cement, granules of grain size sufficiently small to permit such installations but of a material having fine interconnecting pores and channels such that the granules individually have a permeability of the order of at least 60 darcies and which have the characteristics, as regards permeability and fluid channel shape and size, of granules made by burning clay containing finely-divided combustible material of elongated shape whereby to leave fine interconnected voids and channels in the clay on burning out the substance, and gas generating material of a length materially greater than the size of cement particles and in such amount as to develop permeability in the cement when the composition is caused to set under superatmospheric pressure such as obtains in the producing regions of oil wells.

4. A composition for providing permeable packs in wells, comprising cement, granules of a material having fine interconnecting pores and channels such that the granules individually are highly permeable, a substance associated with the granules for temporarily protecting the pores and removable by a solvent and gas generating material of such character and in such amount as to develop an initial permeability when the composition is caused to set under superatmospheric pressure, to admit solvent through the set composition.

5. The composition of claim 4 wherein the granules are of a permeable refractory made by incorporating combustible material in a clay mix and firing the mix.

6. The composition of claim 4 wherein the granules are of such size as to pass an 8-mesh screen and to be retained by a 20-mesh screen.

7. The composition of claim 4 wherein the granules have a permeability of about 60 to 80 darcies.

8. The composition of claim 4 wherein the cement is Portland cement.

9. The composition of claim 4 wherein the gas-generating material is adapted to generate hydrogen.

10. The composition of claim 4 wherein the gas-generating material comprises metallic aluminum and an alkali.

11. The method of claim 2 wherein the voids of the granules are stopped with a viscous oil.

12. The method of claim 2 wherein the voids of the granules are stopped with a substance which is oil-soluble and is flushed out by oil produced from the formation.

13. The method of claim 2 wherein the voids of the granules are stopped with a stopping substance which is flushed out by a charge of a solvent injected into the well after the cement has set.

14. A method of providing permeable cement packs in oil and gas wells which comprises introducing into the producing region of a well a slurry of cement containing granules of a fluid-permeable porous material, the pores being temporarily filled with a soluble fluent material, the slurry also containing a gas generating agent adapted to generate a gas relatively insoluble in water, causing the slurry to set adjacent the producing region with development of initial permeability by gas generation, and causing the well to produce through the set cement pack.

15. A method of providing permeable cement packs in oil and gas wells which comprises introducing into the producing region of a well a slurry of cement containing granules of porous, permeable material, the pores of which are temporarily stopped with a substance insoluble in water but soluble in other solvents, and also containing a gas-generating agent, causing the slurry to set adjacent the producing region of the well with development of some permeability by the gas-generating agent, and introducing into the well under pressure and in contact with the set slurry a solvent for said substance whereby to flush out the pore-stopping substance.

16. In the producing region of a well, a body of permeable cement comprising set Portland cement containing gas pores and containing granules of porous permeable material, the pores of which are temporarily stopped with a substance insoluble in water but soluble in other solvents.

17. The composition of claim 4 wherein the cement slurry contains aluminum, an alkali reactive with aluminum and a substance adapted to delay reaction between the aluminum and alkali.

18. The composition of claim 4 wherein the cement slurry contains a substance adapted to delay the generation of gas.

LESLIE W. VOLLMER.